US006650460B2

(12) United States Patent
Kurematsu

(10) Patent No.: US 6,650,460 B2
(45) Date of Patent: Nov. 18, 2003

(54) PROJECTION TYPE DISPLAY APPARATUS

(75) Inventor: Katsumi Kurematsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/982,469

(22) Filed: Oct. 18, 2001

(65) Prior Publication Data

US 2002/0054423 A1 May 9, 2002

(51) Int. Cl.$^7$ .................. G02B 26/00; G02B 26/08; G02F 1/00
(52) U.S. Cl. .................. 359/291; 359/224; 359/298; 348/755
(58) Field of Search .................. 359/290, 291, 359/298, 214, 221, 224, 846, 223, 295; 310/306, 307, 328; 353/31; 348/671, 755

(56) References Cited

U.S. PATENT DOCUMENTS 5,689,321 A * 11/1997 Kochi .................. 349/143
5,774,254 A * 6/1998 Berlin .................. 359/259
2002/0030893 A1 * 3/2002 Dewald et al. .................. 359/618

FOREIGN PATENT DOCUMENTS

JP 8-21977 1/1996

OTHER PUBLICATIONS

Hornbeck, L. "Current Status of the Digital Micromirror Device (DMD) for Projection Television Applications," IEDM, pp. 15.1.1–15.1.4, Dec. 1993.*

* cited by examiner

Primary Examiner—Georgia Epps
Assistant Examiner—William Choi
(74) Attorney, Agent, or Firm—Morgan & Finnegan, LLP

(57) ABSTRACT

The invention relates to a projection type display apparatus having an optical modulating device (3) controlling a light reflecting state by using a mirror array device, and a projecting optical system (4) projecting reflected light of light illuminated from the optical modulating device (3). In the apparatus, the mirror array device is illuminated by R, G and B color light components from different directions, and at least a part of the reflected light of the mirror array device is selectively guided to the projecting optical system (4) to project the light on to the screen or the like by controlling a tilt angle of the mirror array device.

18 Claims, 3 Drawing Sheets

PROJECTION TYPE DISPLAY APPARATUS

BACKGROUND OF THE INVENTION

1. Field of the Invention

The present invention relates to a projection type display apparatus and, more particularly, to a projection type display apparatus for displaying a full-color image on a display surface such as a screen using a mirror array device as optical modulation means.

2. Related Background Art

Along with the advent of the age of multimedia, image display apparatuses are used in every scene. Generally, display apparatuses for forming an image by modulating light are roughly classified into two types. One type is a direct viewing image type display apparatus such as a direct viewing CRT (Cathode Ray Tube) and direct viewing LCD, and the other type is a projection type display apparatus, including a LCD (Liquid Crystal Display), and a mirror device such as a DMD (Deformable Mirror Device), or AMA (Actuated Mirror Array). Since projection type display apparatuses can easily increase the screen size, front projectors for presentation or the like and rear projectors for a home theater or the like are becoming widely used. In such a projection type display apparatus using a liquid crystal panel or mirror device, the liquid crystal panel or mirror device serving as an optical modulation device is illuminated with light from a light source, and transmitted or reflected light is made incident on a screen or the like through a projecting optical system, thereby forming an image.

Although a direct viewing CRT is excellent in image quality, the weight and volume of the apparatus increase, and the manufacturing cost increases as the screen size increases. To the contrary, a projecting liquid crystal display apparatus can be made relatively thin, and the weight and volume can be reduced because its optical structure is simple. However, since an LCD normally uses linearly polarized light, the light utilization efficiency is as low as 1% to 5%. In addition, liquid crystal molecules respond slowly, and the liquid crystal layer is readily heated.

To solve the above problems, projection type display apparatuses using a mirror device such as a DMD or AMA have been developed. Currently, such projection type display apparatuses can obtain a light utilization efficiency of 5% to 10%. In addition, optical modulation is not affected by the polarization state of incident light and does not affect the polarization state of reflected light.

AMAs serving as mirror devices are roughly classified into a bulk type and a thin-film type. A bulk AMA is disclosed in U.S. Pat. No. 5,469,302 by Dae-Young Lim. To obtain the bulk AMA, a ceramic layer having a multilayered structure is cut into a thin ceramic wafer with a metal electrode formed inside, the ceramic wafer is mounted on an active matrix incorporating a transistor, the resultant structure is fabricated by sawing, and a mirror is formed on it.

A thin-film AMA is disclosed in U.S. Pat. No. 5,815,305. Referring to FIG. 4, the thin-film AMA has an active matrix 31, an actuator 33 formed on the active matrix 31, and a mirror 35 formed on the actuator 33.

The active matrix 31 has a substrate 37, and M×N (M and N are positive integers) transistors (not shown) formed on the substrate 37, and M×N connection terminals 39 formed on the respective transistors.

The actuator 33 has a support portion 41 formed on the active matrix 31 and having the connection terminal 39, a first electrode 43 whose lower end on one side is attached to the support portion 41 and other side is formed in parallel to the active matrix 31, an interconnection or conductive tube 49 formed in the support portion 41 to connect the connection terminal 39 and first electrode 43, a deformable layer 45 formed on the first electrode 43, a second electrode 47 formed on the deformable layer 45, a spacing member 51 formed on one side of the second electrode 47, and a support layer 53 whose lower end on one side is attached to the spacing member 51 and other side is formed in parallel to the second electrode 47. The second electrode 47 is connected to the active matrix 31 by an interconnection (not shown). The mirror 35 is formed on the support layer 53.

When a predetermined electrical signal (voltage) corresponding to an image signal is applied to the first electrode 43 of each pixel through the active matrix 31, each pixel actuator 33 tilts by a predetermined angle, and accordingly, each pixel mirror 35 tilts.

FIG. 3 shows this state. The pixel mirror 35 tilts by a predetermined amount in accordance with the voltage applied to the first electrode 43, as indicated by an arrow A. The reflecting direction of reflected light of a light beam L incident on the mirror 35 changes in accordance with the tilt amount, as indicated by an arrow B.

Such a thin-film AMA is manufactured using semiconductor manufacturing processes. For this reason, the mirror array has a perfect quality so that light enough to display digital image with a high-luminance and high-contrast under normal indoor illumination conditions can be transmitted to the screen. In other words, a thin-film AMA is a reflection-type optical modulator using a thin-film piezoelectric actuator in relation to a microscopic mirror and has been developed to obtain a tilt angle enough to provide high contrast and a light utilization efficiency enough to provide high luminance. A thin-film AMA has also been developed to ensure uniformity in a large scale integration across 300,000 pixels of mirrors formed from a single pattern.

As for forming a projection type display apparatus using a mirror device such as a thin-film AMA or DMD, a typical arrangement is disclosed in, e.g., Japanese Patent Application Laid-open No. 8-21977. That is, white illumination light is time-divisionally color-separated by a rotary color filter, a mirror device is illuminated with each color light component, and reflected light is guided into or outside the aperture of a projecting lens in accordance with tilt drive of each pixel mirror, thereby obtaining a predetermined full-color projected image.

In the prior art disclosed in Japanese Patent Application Laid-open No. 8-21977, however, in projecting a full-color image, the illumination system has at least a rotary filter, a rotary filter drive motor, and a rotary syndronized signal processing system for color separation, resulting in complex structure. Additionally, since the rotary filter, i.e., a section rotatably driven at a high speed of up to 10,000 rpm is present, the system has problems in vibration noise and reliability.

SUMMARY OF THE INVENTION

One aspect of the present invention is to provide a projection type display apparatus comprising:

a mirror array device for performing optical modulation by a plurality of tiltable pixel mirrors;

an illumination optical system for illuminating the mirror array device with a plurality of color light components of different colors from different directions; and a projecting optical system for projecting reflected light components from the mirror array device onto a projected surface, wherein tilt angles of the pixel mirrors have a plurality of angle ranges that do not overlap each other, and one of the plurality of color light components is projected onto the projected surface for each angle range.

An apparatus described above preferably has a feature that each pixel mirror is not tilted to display black on the projected surface.

An apparatus described above preferably has a feature that the tilt angle of each pixel mirror is maximized to display black on the projected surface.

An apparatus described above preferably has a feature that each pixel mirror is tilted by a predetermined angle to display black on the projected surface.

An apparatus described above preferably has a feature that the projecting optical system has an aperture which shields, of the reflected light components from the mirror array device, a light component which is not to be projected onto the projected surface.

An apparatus described above preferably has a feature that the plurality of light components of different colors are red, green, and blue light components, and a color to be displayed on the projected surface is switched between red, green, and blue by switching the angle range including the tilt angle of each pixel mirror.

An apparatus described above preferably has a feature that gray level display of each color is performed by changing the tilt angle of each pixel mirror.

An apparatus described above preferably has a feature that gray level display of each color is performed by changing the tilt angle of each pixel mirror.

An apparatus described above preferably has a feature that color display of one pixel is performed by mixing the color light components from the pixel mirrors by time color mixing.

An apparatus described above preferably has a feature that color display of one pixel is performed by mixing the color light components from the plurality of pixel mirrors adjacent to each other.

An apparatus described above preferably has a feature that the angle ranges include first, second, third, and fourth ranges, when the tilt angle falls within the first range, red is displayed on the projected surface, when the tilt angle falls within the second range, green is displayed on the projected surface, when the tilt angle falls within the third range, blue is displayed on the projected surface, and when the tilt angle falls within the fourth range, black is displayed on the projected surface.

An apparatus described above preferably has a feature that gray level display of each color is performed by changing the tilt angle of each pixel mirror within each angle range.

An apparatus described above preferably has a feature that the pixel mirrors in the mirror array device are simultaneously illuminated with the plurality of color light components of different colors from different directions.

The other aspect of the present invention is to provide a projection type display apparatus comprising:

a mirror array device for performing optical modulation by a plurality of tiltable pixel mirrors; and a projecting optical system for projecting reflected light components from the mirror array device onto a projected surface, wherein tilt angles of the pixel mirrors have a plurality of angle ranges that do not overlap each other, and a color of a light component guided to the projecting optical system by each pixel mirror changes for each angle range.

An apparatus described above preferably has a feature that a color to be guided to the projecting optical system is switched between red, green, and blue by switching the angle range including the tilt angle of each pixel mirror.

An apparatus described above preferably has a feature that gray level display of each color is performed by changing the tilt angle of each pixel mirror.

An apparatus described above preferably has a feature that gray level display of each color is performed by changing the tilt angle of each pixel mirror.

An apparatus described above preferably has a feature that color display of one pixel is performed by mixing the color light components from the pixel mirrors by time color mixing.

An apparatus described above preferably has a feature that color display of one pixel is performed by mixing the color light components from the plurality of pixel mirrors adjacent to each other.

An apparatus described above preferably has a feature that the angle ranges include first, second, third, and fourth ranges, when the tilt angle falls within the first range, red is displayed on the projected surface, when the tilt angle falls within the second range, green is displayed on the projected surface, when the tilt angle falls within the third range, blue is displayed on the projected surface, and when the tilt angle falls within the fourth range, black is displayed on the projected surface.

An apparatus described above preferably has a feature that gray level display of each color is performed by changing the tilt angle of each pixel mirror within each angle range.

An apparatus described above preferably has a feature that the pixel mirrors in said mirror array device are simultaneously illuminated with the plurality of color light components of different colors from different directions.

DETAILED DESCRIPTION OF THE PREFERRED EMBODIMENTS

The embodiments of the present invention will be described below with reference to the accompanying drawings.

Figure 1:
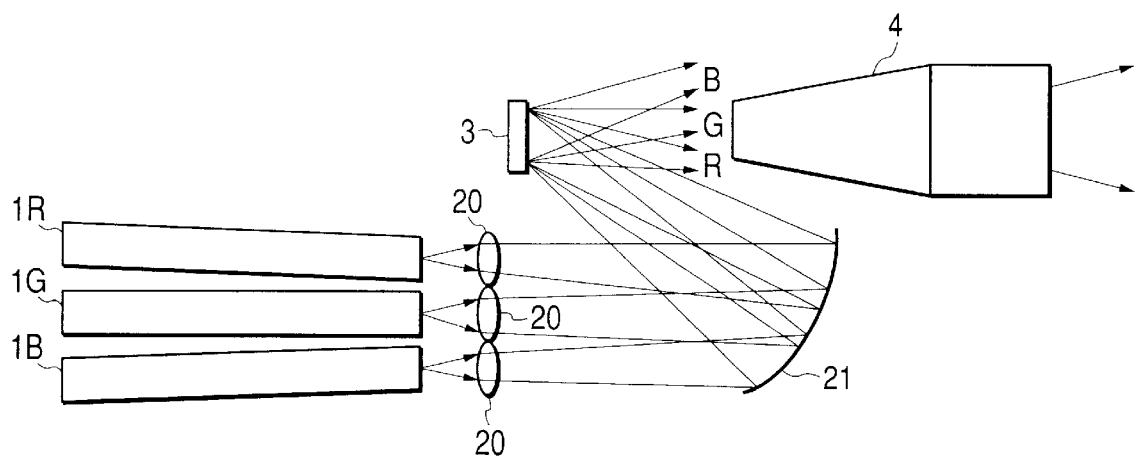
FIG. 1 is a view showing the system configuration of a projection type display apparatus according to the first embodiment of the present invention.

As shown in FIG. 1, a projection type display apparatus of the present invention comprises a thin-film AMA 3 for displaying an image by controlling the reflecting direction of light for each pixel using a thin-film piezoelectric actuator, single-color illumination units 1R, 1G, and 1B for irradiating the AMA 3 with three primary color light components, and a projecting optical system 4 for projecting reflected light of the R (red), G (green), and B (blue) light components with which the AMA 3 is irradiated. When the projection light is projected onto a screen (not shown), an image is displayed.

A television signal or video signal is applied to the piezoelectric actuator (pixel mirror actuator) of each pixel of the mirror device at a predetermined timing. Accordingly, each pixel mirror in the AMA sequentially executes tilt operation of a predetermined amount.

Figure 6:
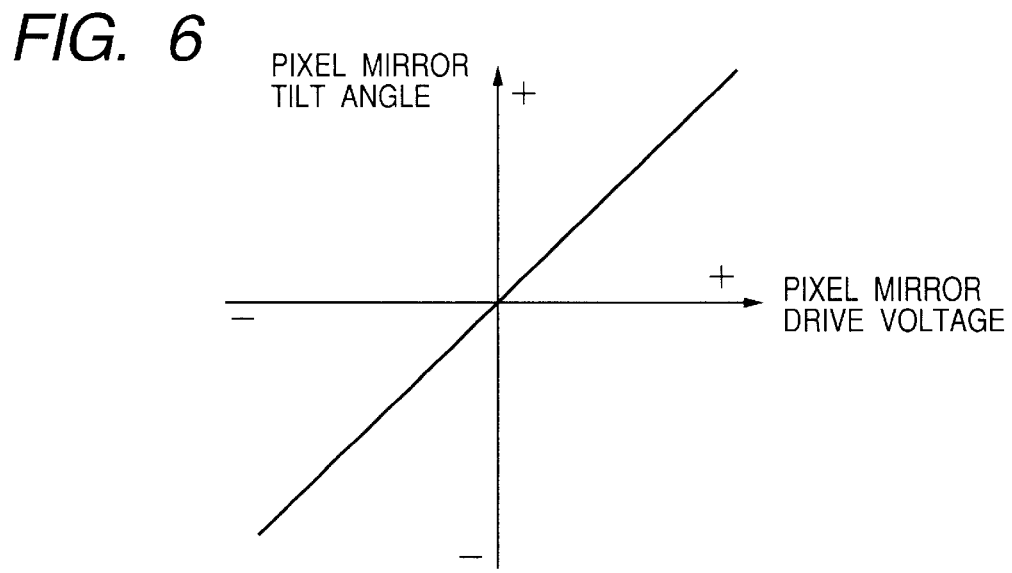
FIG. 6 is a graph showing the correlation between the pixel mirror tilt angle and the pixel drive voltage of the AMA pixel mirror.

FIG. 6 shows the relationship between the drive voltage applied to the pixel mirror actuator and the pixel mirror tilt angle generated at that time. As is apparent from FIG. 6, in the default state wherein no drive voltage is applied to the actuator, the pixel mirror does not tilt, and the tilt angle is 0. When a negative voltage is applied, the pixel mirror tilts in a direction reverse to that when a positive voltage is applied.

ON/OFF of the projected image is determined depending on whether a reflected light beam from each pixel enters the entrance aperture of the projecting optical system 4, i.e., an aperture or the aperture of a member corresponding to an aperture. If the light beam is partially captured by the aperture, the gray level display of an image is determined by the degree of capture.

Each of the single-color illumination units 1R, 1G, and 1B of three primary colors is formed from a single-color laser and beam expander. The optical axes of the three units are not parallel. An exit light beam diverges by a predetermined amount. As a single-color laser for red, a krypton laser is used. As a single-color laser for green, a krypton laser or argon laser is used. As a single-color laser for blue, an argon laser is used. However, the present invention is not limited to these lasers, and any other laser source that oscillates light in the red, green, or blue wavelength band can be used. The laser may be either a solid laser or a gas laser.

Light components of R, G, and B primary colors are emitted from the single-color illumination units 1R, 1G, and 1B of the three primary colors as divergent light beams, condensed by collimator lenses 20, and reach a concave mirror 21. The light components are condensed and reflected by the mirror 21 to illuminate the AMA 3. The R, G, and B color light components illuminate the AMA 3 at different incident angles, as shown in FIG. 1. In the default state wherein the pixel mirrors in the AMA 3 do not tilt, reflected light components from the AMA 3 are reflected as shown in FIG. 1, so the R, G, and B color light components are separated at the entrance aperture of the optical system 4. The focal point of each light beam by the concave mirror can be either in front of or behind the entrance aperture. To obtain the gray level of each color, each condensing point is set at a position separated from the entrance aperture to some extent such that the light beam has a predetermined size near the entrance aperture.

Figure 5:
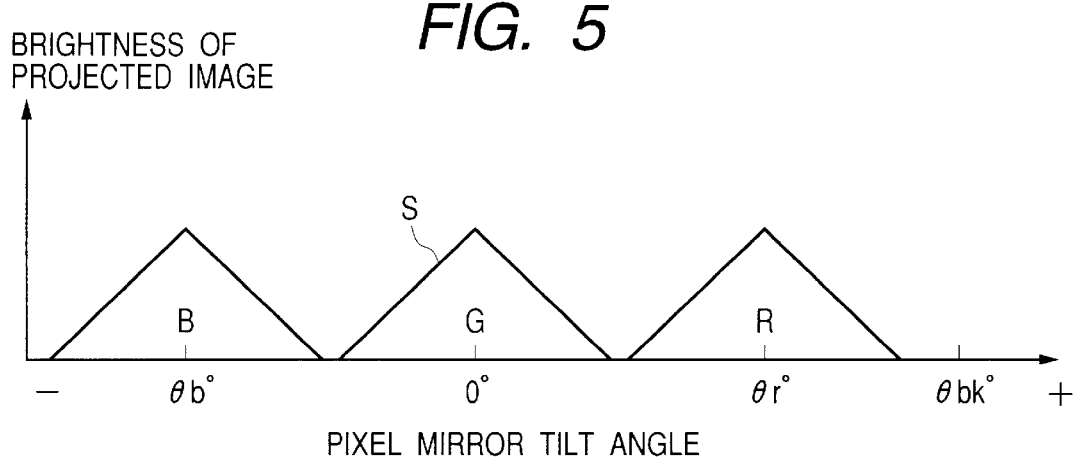
FIG. 5 is a graph showing the correlation between the AMA pixel mirror tilt angle and the brightness of a projected image.

When each pixel mirror tilts (the direction of tilt matches the RGB light beam separation direction in FIG. 1), the mirror tilt angle and the amount of the each exit light component from the projecting optical system 4 after passing through the entrance aperture, i.e., the brightness of the projected image have a relationship shown in FIG. 5. That is, as the mirror tilt angle changes from the negative direction (when a negative voltage is applied to the pixel mirror actuator) to the positive direction (when a positive voltage is applied to the pixel mirror actuator), a B light component gradually exits and switches to a G light component and then to an R light component. At the maximum tilt angle, all light components fall outside the aperture, and a state wherein no light exits (black display) can be obtained. The state wherein no light exits (black display) can be obtained even at a tilt angle of 0°, i.e., even when no voltage is applied. The black display state may be obtained not at the maximum tilt angle or 0° but at a predetermined angle.

When the characteristic shown in FIG. 5 and, more particularly, the gradient relationship between the pixel mirror tilt angle and the brightness of the projected image, which is indicated by S in FIG. 5, is used, gray level display of each color is possible. Referring to FIG. 5, the range near $\theta b°$ where the B light component exits from the projecting optical system 4 is the angle range for blue display. The range near 0° (or $\theta g°$) where the G light component exits from the projecting optical system 4 is the angle range for green display. The range near $\theta r°$ where the R light component exits from the projecting optical system 4 is the angle range for red display. The range near $\theta bk°$ and on the positive side of the angle range for red display is the angle range for black display, i.e., the range wherein no light exits from the projecting optical system 4.

Figure 7:
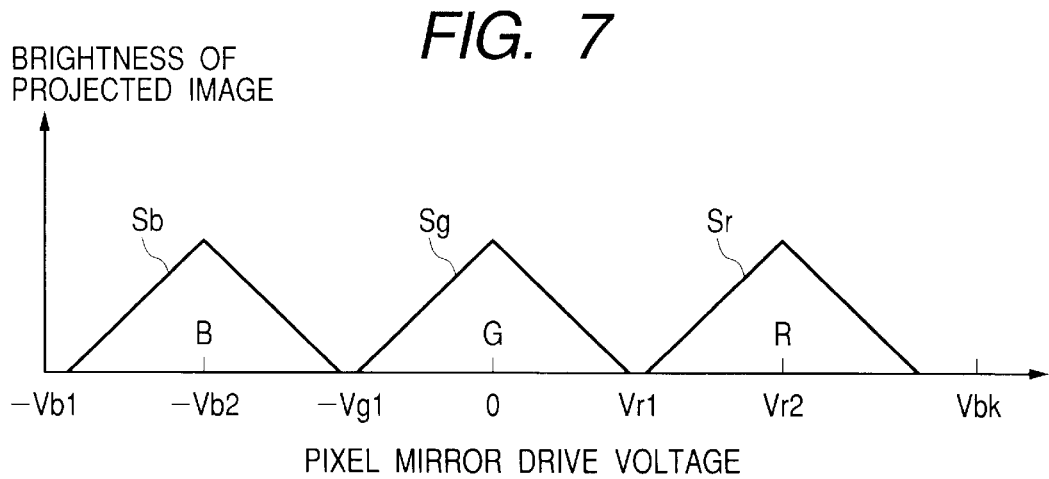
FIG. 7 is a graph showing the correlation between the brightness of a projected image and the pixel drive voltage of the AMA pixel mirror.

The pixel mirror tilt angle and the pixel mirror drive voltage have a proportional relationship shown in FIG. 6. Hence, the pixel mirror drive voltage and the brightness of the projected image have a relationship shown in FIG. 7, as is apparent from the above two relationships.

According to this embodiment, color switching and gray level display of each color light component can be done only by controlling the drive voltage to each pixel mirror. That is, gray level display of an R image is done using a gradient Sr (drive voltage is Vr1 to Vr2) in FIG. 7, gray level display of a G image is done using a gradient Sg (drive voltage is Vg1 to 0), and gray level display of a B image is done using a gradient Sb (drive voltage is −Vb1 to −Vb2). In addition, black display is done using a drive voltage Vbk. The drive voltage Vbk for black display can have any value.

In this embodiment, a full-color image may be displayed by a method of displaying primary color image frames on the projected surface (screen) in the order of RGBRGB . . . , i.e., time color mixing, or by a method of determining display colors for the respective pixels as a mosaic pattern and forming a pixel of the image to be projected on the projected surface (screen) using a plurality of pixel mirrors adjacent to each other, i.e., spatial color mixing. In the former case, although the number of frames per unit time is increased to three times or more the normal number of frames by high-speed drive, an image can be displayed at the original resolution of the AMA. In the latter case, the normal drive speed suffices. Additionally, in this embodiment, with the single hardware configuration, color reproduction (display) in different color mixing modes or switching between the modes can be easily performed only by changing the drive signal (voltage) to each pixel in the AMA. In the above-described time color mixing, images are displayed on the screen in the order of RGBRGB . . . . However, the order of colors is not limited to the above example. If necessary, images may be displayed in the order of RGBGRGB . . . , i.e., the number of times of display of G images may be larger than that of R or B images. The number of times of display may be increased not for G images but for images of another color, or the number of times of display may be changed for each color image.

Furthermore, according to this embodiment, the tilt angles of the pixel mirrors are limited to only four angles: $\theta r°$, 0°, θb°, and θbk° in FIG. 5, and the pixel mirrors are driven only by four drive voltages corresponding to these angles. In this arrangement, pixel mirror tilt drive is used only for color switching including black display. For gray level display, high-speed drive is executed to multiply the frame frequency in the above two examples by the number of reproduced (displayed) gray levels such that a gray level is reproduced in time average by the number of times of display per unit time (digital time gray level), thereby achieving a full-color display. The tilt angles may be limited to three angles: $-\theta°$, $0°$, and $+\theta°$ to display black and two color light components. Alternatively, full-color display may be achieved by making three tilt angles correspond to red, green, and blue display, respectively, and preparing a separate light-shielding means for black display.

As described above, according to this embodiment, a full-color image can be projected and displayed using a single AMA without any movable portion such as a rotary color filter. Since no movable portion is present, a noise-free reliable projection type display apparatus having a simple so-called single AMA structure can be formed.

Figure 2:
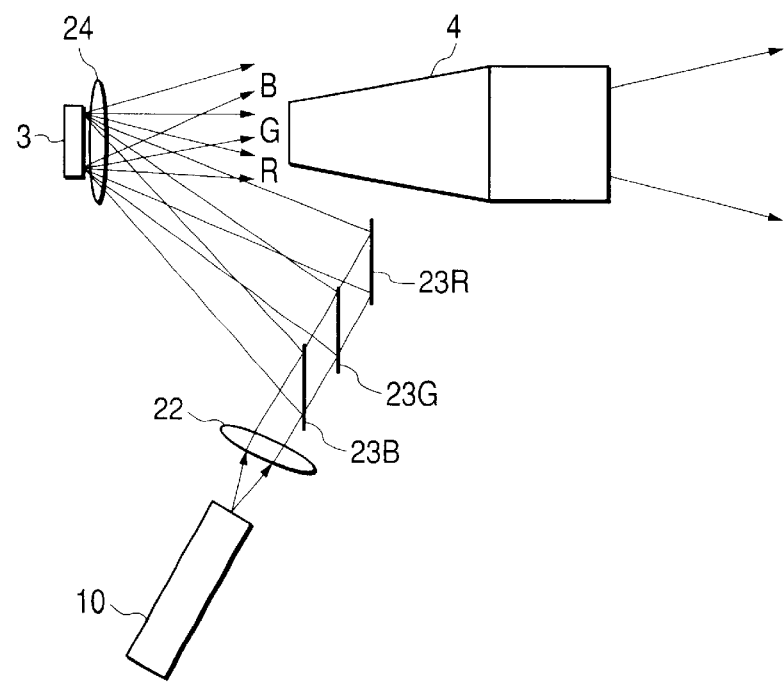
FIG. 2 is a view showing the system configuration of a projection type display apparatus according to the second embodiment of the present invention.
Figure 3:
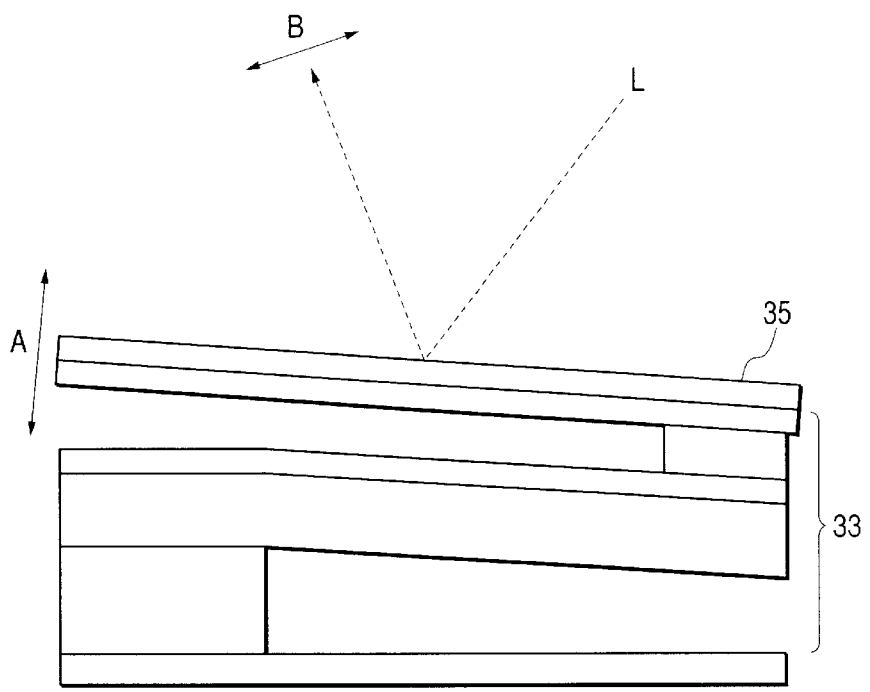
FIG. 3 is a sectional view for explaining the operation principle of reflected light reflection angle modulation in an AMA.
Figure 4:
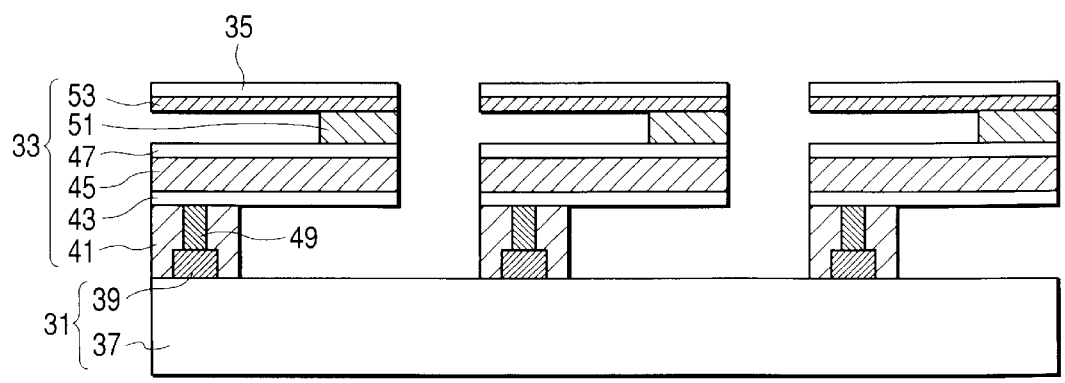
FIG. 4 is a sectional view showing the structure of a thin-film AMA.

FIG. 2 shows another embodiment of the present invention. The projection type display apparatus comprises a white illumination unit 10 formed from a beam expander and white laser (He—Cd laser), a collimator lens 22, a B light reflecting and Y (yellow) light transmitting dichroic filter 23B, a G light reflecting and R light transmitting dichroic filter 23G, and an R light reflecting dichroic filter 23R. Reflected color light components from the dichroic mirrors set at predetermined angles illuminate an AMA 3 from different angles. When filters for transmitting infrared rays are used as the three dichroic filters 23R, 23G, and 23B, the AMA 3 can be prevented from being heated by the infrared rays.

The reflected light components from the AMA 3 are condensed by a field lens 24 located in front of the AMA 3. For this reason, when the reflected light components reach the entrance aperture of a projecting optical system 4, the R, G, and B color light components are separated, as in the above-described embodiment. Hence, a full-color image can be displayed by the same function as in the above-described embodiment in principle.

In this embodiment, the light source is formed from only one white laser. Hence, a single-AMA full-color projection type display apparatus similar to the above embodiment can be formed with a simpler arrangement, though it depends on the performance of the white laser.

Instead of the dichroic mirrors 23R, 23G, and 23B, a known reflecting echelon grating may be used. When a reflecting echelon grating is used, the color light components can be diffracted in different directions and satisfactorily separated. In addition, a reflecting echelon grating is smaller than a dichroic mirror.

For the above-described embodiments, the following changes and modifications can be made.

(1) As the light source, a lamp is used in place of the laser. When a lamp for emitting white light is used, color components are separated using dichroic filters, dichroic mirrors, or diffraction grating, and the plurality of color-separated light components are guided to pixel mirrors.

(2) As the mirror device, a bulk AMA or DMD is used in place of the thin-film AMA.

(3) As the optical element, not the concave mirror but a convex lens is used. A plurality of convex lenses, an optical unit having a positive refracting power as a whole, or a diffraction grating may be used.

(4) A rear projection type or front projection type projector is formed.

What is claimed is:

1. A projection type display apparatus comprising:
a mirror array device for performing optical modulation by a plurality of tiltable pixel mirrors;
an illumination optical system for illuminating said mirror array device with a plurality of color light components of different colors from different directions; and
a projecting optical system for projecting reflected light components from said mirror array device onto a projected surface,
wherein tilt angles of the pixel mirrors have a plurality of angle ranges that do not overlap each other, one of the plurality of color light components is projected onto the projected surface for each angle range, and gray level display of each color is performed by changing the tilt angle of each pixel mirror.

2. An apparatus according to claim 1, wherein each pixel mirror is not tilted to display black on the projected surface.

3. An apparatus according to claim 1, wherein the tilt angle of each pixel mirror is maximized to display black on the projected surface.

4. An apparatus according to claim 1, wherein each pixel mirror is tilted by a predetermined angle to display black on the projected surface.

5. An apparatus according to claim 1, wherein said projecting optical system has an aperture which shields, of the reflected light components from said mirror array device, a light component which is not to be projected onto the projected surface.

6. An apparatus according to claim 1, wherein the plurality of light components of different colors are red, green, and blue light components, and
a color to be displayed on the projected surface is switched between red, green, and blue by switching the angle range including the tilt angle of each pixel mirror.

7. An apparatus according to claim 1, wherein color display of one pixel is performed by mixing the color light components from the pixel mirrors by time color mixing.

8. An apparatus according to claim 1, wherein color display of one pixel is performed by mixing the color light components from the plurality of pixel mirrors adjacent to each other.

9. An apparatus according to claim 1, wherein the angle ranges include first, second, third, and fourth ranges,
when the tilt angle falls within the first range, red is displayed on the projected surface,
when the tilt angle falls within the second range, green is displayed on the projected surface,
when the tile angle falls within the third range, blue is displayed on the projected surface, and
when the angle falls within the fourth range, black is displayed on the projected surface.

10. An apparatus according to claim 9, wherein gray level display of each color is performed by changing the tilt angle of each pixel mirror within each angle range.

11. An apparatus according to claim 1, wherein the pixel mirrors in said mirror array device are simultaneously illuminated with the plurality of color light components of different colors from different directions.

12. A projection type display apparatus comprising:
a mirror array device for performing optical modulation by a plurality of tiltable pixel mirrors; and
a projecting optical system for projecting reflected light components from said mirror array device onto a projected surface, wherein tilt angles of the pixel mirrors have a plurality of angle ranges that do not overlap each other, a color of a light component guided to said projecting optical system by each pixel mirror changes for each angle range, and gray level display of each color is performed by changing the tilt angle of each pixel mirror.

13. An apparatus according to claim 12, wherein a color to be guided to said projecting optical system is switched between red, green, and blue by switching the angle range including the tilt angle of each pixel mirror.

14. An apparatus according to claim 12, wherein color display of one pixel is performed by mixing the color light components from the pixel mirrors by time color mixing.

15. An apparatus according to claim 12, wherein color display of one pixel is performed by mixing the color light components from the plurality of pixel mirrors adjacent to each other.

16. An apparatus according to claim 12, wherein the angle ranges include first, second, third, and fourth ranges, when the tilt angle falls within the first range, red is displayed on the projected surface, when the tilt angle falls within the second range, green is displayed on the projected surface, when the tile angle falls within the third range, blue is displayed on the projected surface, and when the angle falls within the fourth range, black is displayed on the projected surface.

17. An apparatus according to claim 16, wherein gray level display of each color is performed by changing the tilt angle of each pixel mirror within each angle range.

18. An apparatus according to claim 12, wherein the pixel mirrors in said mirror array device are simultaneously illuminated with the plurality of color light components of different colors from different directions.

* * * * *

UNITED STATES PATENT AND TRADEMARK OFFICE
CERTIFICATE OF CORRECTION

PATENT NO.     : 6,650,460 B2
DATED          : November 18, 2003
INVENTOR(S)    : Katsumi Kurematsu It is certified that error appears in the above-identified patent and that said Letters Patent is hereby corrected as shown below:

<u>Title page,</u>
Please add Item:

-- [30]     Foreign Application Priority Data

October 18, 2000     (JP)     2000-318137 --

Signed and Sealed this

Fifteenth Day of June, 2004

JON W. DUDAS
*Acting Director of the United States Patent and Trademark Office*